United States Patent Office 3,824,255
Patented July 16, 1974

3,824,255
PROCESS FOR THE PRODUCTION OF
TETRONIC ACID
Karl-Josef Boosen, La Neuveville, Switzerland, assignor
to Lonza Ltd., Basel, Switzerland
No Drawing. Filed Sept. 2, 1971, Ser. No. 177,448
Claims priority, application Switzerland, Sept. 4, 1970,
13,264/70
Int. Cl. C07d 5/06
U.S. Cl. 260—343.6      9 Claims

ABSTRACT OF THE DISCLOSURE

Preparation of tetronic acid from γ-haloacetoacetic acid by reaction with alkaline reagent in aqueous solution followed by evaporation to dryness and sublimation of the residue at elevated temperature and high vacuum.

BACKGROUND OF INVENTION

Tetronic acid is used, amongst other purposes, as an accelerator for photographic development. It has been produced by catalytic hydrogenation of α-bromotetronic acid which, in turn, is prepared by splitting out the alkyl halide from an α,γ-dibromoacetic acid ester under vacuum. The process is described in U.S. Pat. 3,305,363. A disadvantage of the process is the necessity of starting from the dibromo derivative of the acetoacetic ester.

It is also known to prepare tetronic acid derivatives by reaction of γ-bromoacetoacetic ester. The process is described in Russian Pat. 164,298. The description, however, does not include a process for the direct preparation of tetronic acid.

THE INVENTION

A process has now been discovered for the preparation of tetronic acid in highly purified form. In accordance with this invention the desired product is prepared by reacting a γ-haloacetoacetic acid with an alkaline reagent in an aqueous composition at a temperature up to about 55° C. until the salt of the desired product forms in appreciable amounts. The mixture is then acidified with an inorganic acid, suitably a non-oxidizing mineral acid to form tetronic acid. The product is isolated from the mixture by evaporation to substantial dryness followed by sublimation of the acid at elevated temperature under high vacuum.

Suitable γ-haloacetoacetic acids include the fluorine, chlorine and bromine derivatives. The preferred reactants are γ-bromoacetoacetic acid and γ-chloroacetoacetic acid.

Alkaline reagents in water are utilized to remove the halogen. Alkaline hydroxides, especially alkali metal hydroxides such as sodium and potassium hydroxide are especially preferred. While some of the desired product is formed with even small quantities, for example equimolar quantities of alkaline reagent, optimum results are obtained when utilizing 2 to 3 mols of the selected hydroxide per mol of γ-haloacetoacetic acid.

The preferred acids are inorganic, mineral, non-oxidizing acids. Concentrated hydrochloric and sulfuric acid are especially useful.

As aforesaid, the reaction takes place in aqueous solution. Typically the acid is dissolved in from about two to five times the quantity of water and the alkali is added, suitably in aqueous solution. Reaction is normally initiated at room temperature, i.e. about 20 °C. to 30° C. Best results are obtained by allowing the reaction to take place during a period of from about fifteen to sixty minutes. During the reaction period the temperature may increase to up to about 53° C., but normally it is held at from about 30° C. to 40° C.

After acidification the reaction mixture is concentrated substantially to dryness, preferably under vacuum. The tetronic acid is isolated in highly purified form by sublimation of the residual mixture at elevated temperature, i.e. at least about 80° C., and high vacuum, i.e. at least about $10^{-3}$ mm. of mercury. Typically, sublimation is effected at from about 80° C. to 130° C., preferably at 100° C. to 105° C., at a pressure of from about $10^{-1}$ to $10^{-3}$ mm. of mercury.

The product of this invention is normally isolated at a purity greater than 99.5%.

The following non-limiting examples are given by way of illustration only.

Example 1

18.1 parts of γ-bromoacetoacetic acid were dissolved in 50 parts of water and a solution of 11.2 parts of KOH in 50 parts of water was added, the temperature rising from room temperature to about 30° C. After stirring for half an hour without further heat supply, acidification was effected with 20 parts of concentrated hydrochloric acid and stirring was then continued for approximately 30 minutes. The aqueous solution was then concentrated by evaporation to dryness in a rotary evaporator under vacuum. The residue was heated in a sublimation apparatus at $10^{-3}$ mm. Hg to 100° C. to 105° C., 4.3 to 4.4 g. of tetronic acid subliming in about 4 hours, this corresponding to a yield of 43 to 44% of the theoretical. M.P. 139°–140° C.; purity>99.5%.

Analysis: Calculated: C, 48.01; H, 4.03; O, 47.96. Molecular weight 100.1. Found: C, 47.8; H, 4.1; O, 48.1. 100 (MS).

Example 2

13.6 parts of γ-chloroacetoacetic acid were dissolved in 50 parts of water and a solution of 8.0 parts of NaOH in 50 parts of water was added. The temperature then rose from 20° C. to 29° C. After stirring for half an hour without further heat supply, the reaction mixture had 20 parts of concentrated hydrochloric acid added thereto and, after stirring for another half an hour, was concentrated by evaporation to dryness in the rotary evaporator under vacuum. The residue was subjected to sublimation at 95° C. to 100° C./$10^{-2}$ mm. Hg, and in about 5 hours, 3.1 to 3.2 g. of tetronic acid sublimed, this corresponding to a yield of 31 to 32% of the theoretical. M.P. 139° C.–140° C., purity>99.5% after potentiometric titration.

The structure was confirmed by elemental analysis and comparison of spectra.

What is claimed is:

1. A process for the production of tetronic acid which comprises the steps of reacting a γ-monohaloacetoacetic acid with an alkaline reagent in water at a temperature of up to 55° C. during a period of from fifteen to sixty minutes, acidifying the mixture with a nonoxidizing mineral acid, concentrating the solution substantially to dryness and isolating tetronic acid from the residue at a temperature from 80° C. to 130° C. at $10^{-1}$ to $10^{-3}$ mm. Hg.

2. A process as in Claim 1 wherein the haloacetoacetic acid is γ-bromoacetoacetic acid.

3. A process as in Claim 1 wherein the haloacetoacetic acid is γ-chloroacetoacetic acid.

4. A process as in claim 1 wherein the base is an alkali metal hydroxide.

5. A process as in Claim 4 wherein the base is sodium hydroxide.

6. A process as in Claim 4 wherein the base is potassium hydroxide.

7. A process as in Claim 1 wherein the haloacetoacetic acid is γ-bromoacetoacetic acid or γ-chloroacetoacetic acid and the base is sodium or potassium hydroxide.

8. A process as in Claim 7 wherein the mineral acid is hydrochloric or sulfuric acid.

9. A process as in Claim 1 wherein the temperature is from about 100° C. to 110° C. and the pressure is from about $10^{-1}$ to $10^{-3}$ mm. of mercury.

References Cited

Chem. Abstracts, vol. 61, 1961, 15979h relied on.
Wagner et al., Synthetic Organic Chemistry, John Wiley and Sons, 1953, p. 535 relied on.

DONALD G. DAUS, Primary Examiner

A. M. T. TIGHE, Assistant Examiner